Patented Apr. 21, 1925.

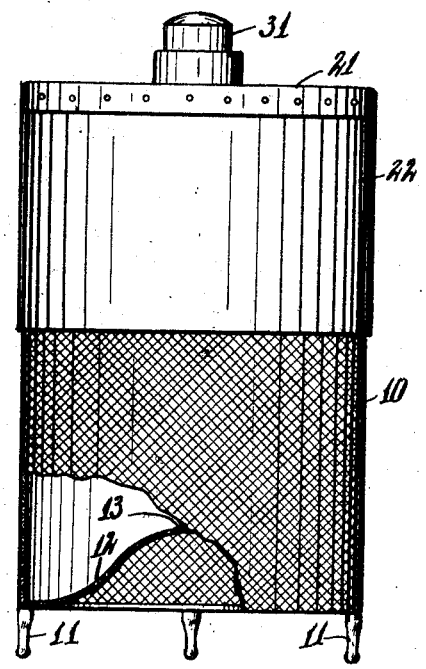
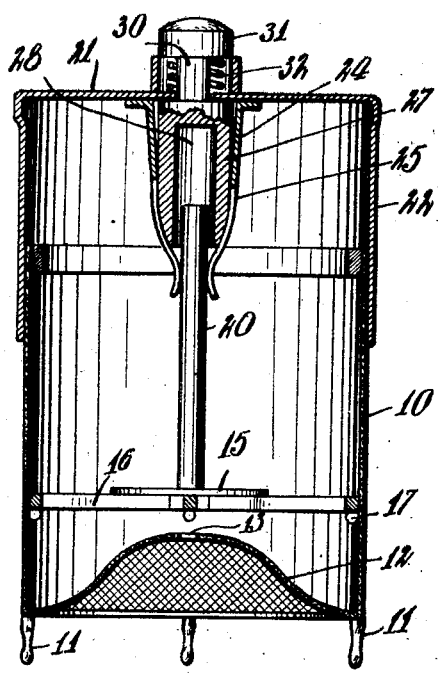
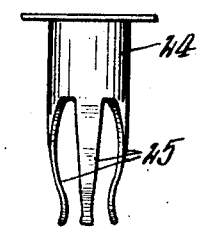

1,534,771

UNITED STATES PATENT OFFICE.

AUGUST CVENGROS, OF CORAOPOLIS, PENNSYLVANIA.

FLYTRAP.

Application filed May 17, 1924. Serial No. 713,888.

*To all whom it may concern:*

Be it known that I, AUGUST CVENGROS, citizen of Czechoslovakia, residing at Coraopolis, in the county of Allegheny and State of Pennsylvania, have invented certain new and useful Improvements in Flytraps, of which the following is a specification.

This invention relates to fly traps, having more particular reference to a fly trap comprising a receptacle which is formed in the bottom with a conical entrance member through which the flies enter the trap, the invention having for an object the provision of a novel trap of this sort characterized by features of adjustability.

For further comprehension of the invention, and of the objects and advantages thereof, reference will be had to the following description and accompanying drawing, and to the appended claims in which the various novel features of the invention are more particularly set forth.

Fig. 1 of the drawing is a side view, with parts broken away, showing my improved trap.

Fig. 2 is a vertical sectional view thereof.

Fig. 3 is a detail side view of the gripping element carried by the cover.

As here shown my improved trap comprises a circular receptacle 10 having cylindrical walls and which may be made of wood. This receptacle is provided with feet 11 whereby it is spaced above the part on which it may rest. The bottom member of the receptacle is shown at 12 and is in the form of a screen which is shaped to frusto-conical form with its base engaging the bottom of the receptacle side wall. This bottom member is formed with a small aperture 13 at the upper end thereof, through which the flies enter the trap.

The flies may be attracted to enter the trap by means of suitable material, such as indicated at 15 which is placed on a spider 16 which rests freely on studs 17 projecting inward from the sides of the receptacle 10, the spider being supported a short distance above the opening 13 in the screen member 12. Fixed to and projecting upward from the spider 16 is a rod 20 which is adapted to be engaged by a member carried by the cover. The cover of the trap is shown at 21 and is provided with a cylindrical peripheral flange 22 of considerable depth which engages frictionally over the receptacle 10, and which may be adjusted vertically as desired to vary the height of the trap.

Fixed to the cover 21, centrally of the latter, is a tubular member 24 which projects downward and is split at its lower end into a number of tongues 25 which curve inwardly to frictionally engage the rod 20, thereby permitting the spider to be lifted with the cover from the trap. Since it is desirable to maintain the spider at all times when the trap is in use, in close adjacence to the opening 13 through which the flies enter I have provided on the cover a device whereby the prongs 25 may be freed from the rod 20 when desired. As here shown a plunger member 27 is slidably mounted within the tubular element 24 and is formed with a boring 28 entered upward from the bottom thereof into which the top of the rod 20 projects freely, the lower end of this member 27 being adjacent the points where the prongs 25 curve inward to grip the rod 20, so that by depressing this member 27 the said prongs may be spread apart to free the rod. The member 27 is provided at its upper end with a diminished neck 30 which projects through a suitable opening in the cover 21 and has a head 31 thereon, an expansion spring 32 bearing between the cover and the head and serving to retain the member 27 in raised position.

As will be apparent, I have provided a fly trap characterized by adjustability, while it will be understood that the features disclosed in detail in Fig. 2 might be applied if desired to other devices where the same might be useful.

While I have illustrated and described a preferred embodiment of my invention it is to be understood that I do not limit myself to the precise construction herein shown and that various changes and modifications might be made therein without departing from the spirit and scope of the invention as defined in the appended claims.

Having thus described my invention what I claim as new and desire to protect by Letters Patent of the United States is as follows:—

1. A fly trap comprising a receptacle having an opening in its bottom, a cover for said receptacle, a bait holding element in the form of a spider, a rod fixed to said spider and extending upward therefrom, and means carried by said cover for frictionally gripping said rod, said means comprising a tubular member depending from the cover and formed on its lower end with resilient inwardly curved tongues.

2. A fly trap comprising a receptacle having an opening in its bottom, a cover for said receptacle, a bait holding element in the form of a spider, a rod fixed to said spider and extending upward therefrom, and means carried by said cover for frictionally gripping said rod, said means comprising a tubular member depending from the cover and formed on its lower end with resilient inwardly curved tongues, and a plunger member slidable in the cover and adapted to engage said tongues to free the cover from the said rod.

In testimony whereof I have affixed my signature.

AUGUST CVENGROS.